United States Patent [19]

Sharp

[11] Patent Number: 5,768,606

[45] Date of Patent: Jun. 16, 1998

[54] METHOD, SYSTEM, COMPUTER PROGRAM PRODUCT AND PROGRAM STORAGE DEVICE FOR DECLARING COLUMN WIDTHS OF MATRICES

[75] Inventor: Frederick T. Sharp, Menlo Park, Calif.

[73] Assignee: International Business Machines Corporation, Armonk, N.Y.

[21] Appl. No.: 521,807

[22] Filed: Aug. 31, 1995

[51] Int. Cl.$^6$ .................................................. G06T 11/00
[52] U.S. Cl. ............................................................ 395/770
[58] Field of Search ............................... 395/770, 139, 395/765, 339, 764; 345/118

[56] References Cited

U.S. PATENT DOCUMENTS

| | | | |
|---|---|---|---|
| 4,457,638 | 7/1984 | Horn et al. | 400/279 |
| 4,506,343 | 3/1985 | Shipp, Jr. et al. | 395/770 |
| 5,062,060 | 10/1991 | Kolnick | 395/339 |
| 5,317,306 | 5/1994 | Abraham et al. | 345/118 |
| 5,588,099 | 12/1996 | Mogilevsky et al. | 395/139 |
| 5,613,131 | 3/1997 | Moss et al. | 395/765 |

*Primary Examiner*—Almis R. Jankus
*Attorney, Agent, or Firm*—Prentiss W. Johnson, Esq.; Sterne, Kessler, Goldstein & Fox P.L.L.C.

[57] ABSTRACT

A system and method for enabling a developer to write a computer program that, when executed, displays a matrix on a computer display device, and a system and method for displaying a matrix on a computer display device. The system receives a request from the developer to create a matrix having rows and columns, where the widths of the columns are defined using a declarative column specification string. This specification string, and optionally, a programming algorithm that modifies or recreates the specification string, are stored in the system. A user then executes a computer program in the system. During execution, a number of events may occur in response to which the utility and usability of the matrix may be improved by adjusting the widths of the columns in the matrix. The invention resizes the width of each column in the matrix according to the column specification string.

56 Claims, 5 Drawing Sheets

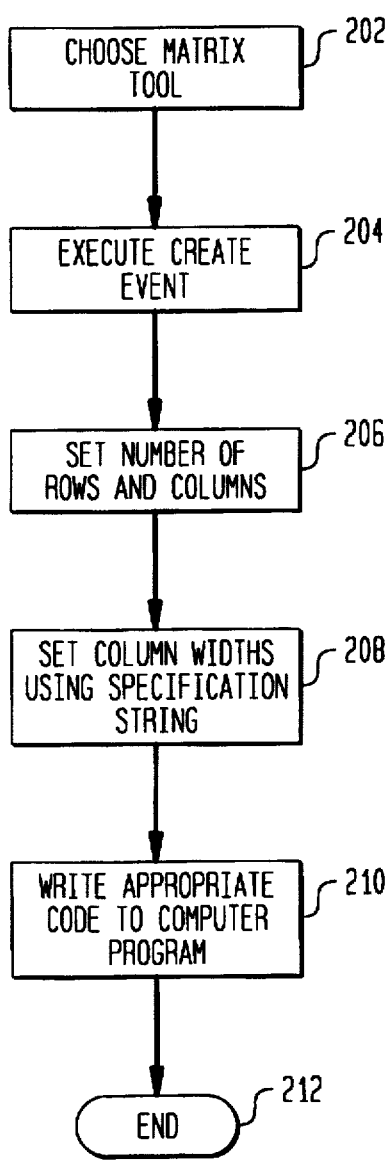
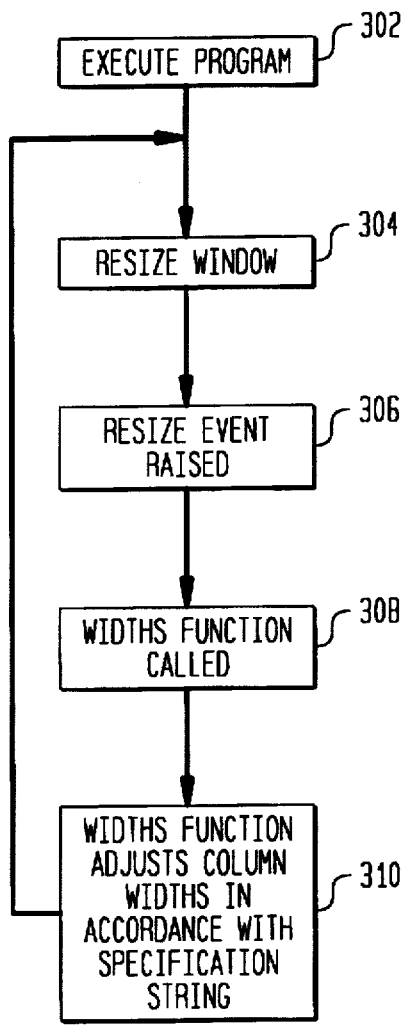

METHOD, SYSTEM, COMPUTER PROGRAM PRODUCT AND PROGRAM STORAGE DEVICE FOR DECLARING COLUMN WIDTHS OF MATRICES

BACKGROUND OF THE INVENTION

1. Field of the Invention

The present invention relates to a method and apparatus for declaring column widths for matrices. Specifically, the present invention relates to a method and apparatus for declaring column widths in a graphical user interface (GUI). More particularly, the present invention relates to a computer program that assists an application developer to easily adjust the widths of matrices, such as when a matrix has been resized by a user or by an algorithm in the application or when any other event occurs in response to which the utility and usability of the matrix may be improved by adjusting the widths of columns in the matrix.

2. Related Art

Many visual builders in software applications have a tool bar, through which application developers may choose a variety of tools to use in constructing an image on the GUI. The application developer may then incorporate this image into a computer program. One tool common to many applications is a matrix tool. A matrix, also typically referred to as a grid or sheet, is a GUI object that can display application data in a two-dimensional array of rectangular cells. The matrix tool permits the developer to create a matrix component. The matrix component lets the application developer display columnar data in a scrolling matrix having columns and rows. Typically, the matrix also has fixed columns and fixed rows that cannot be scrolled.

During program development, the application developer typically chooses the number of columns and rows for the particular matrix and sets column widths for the matrix. These column widths are set during development, set by algorithms at runtime, or adjusted manually (using drag and drop techniques with a mouse) at runtime by the user.

In text-formatting applications, a writer may set the width of columns in a table. A table in such applications is similar to a matrix, except that it is printed (to the screen or paper) rather than displayed as a separate graphical object on a computer display. Thus, when the end user prints the table, the width of each column is adjusted to accommodate the size of the printed page or column in which the table appears. Some of these text-formatting applications use General Markup Language (GML) to specify the column width of the printed table. In the IBM BookMaster™ product, for example, a writer declares the widths of columns in a table using a cols attribute of a table tag:

:table cols='* *'.

The string "* *" is a declarative column width specification for two columns of equal width.

In spreadsheet applications, the spreadsheet also displays data in a two-dimensional array of cells whose widths can be adjusted by the user or by commands in a macro.

SUMMARY OF THE INVENTION

The present invention applies the concept of the Book-Master cols attribute to GUI matrices and expands the column string specification by adding options to the specification string. The present invention enables an application developer to write a computer program that, when executed, displays a matrix on a computer display device. The invention automatically adjusts the column widths of the matrix in a GUI to respond to the user's changes to the size of the matrix or to changes in the lengths of the data displayed in the matrix.

During the program development stage of the invention, an application developer sends a request to the system to create a matrix. The application developer then chooses a specific number of rows and columns for the matrix. The application developer may choose to make some or all of the rows or columns fixed. The application developer then defines the width of each of the columns using a column specification string. In the preferred embodiment, the application developer specifies this string as the value of a property of the matrix. However, the specification may be simply the value of a global variable that is passed to a function that adjusts the column widths. The specification string may also be created or modified during program execution by an algorithm previously designed by the application developer. The application developer can indicate a fixed size for a column by using horizontal units (explicit length option) or a text string literal length option). The developer can indicate an adjustable width option by using a variety of symbols (e.g., an asterisk option, an equal option or a double equal option). The developer can also indicate that a specific column must retain its current size using the exclamation mark option. The information concerning the number of rows and columns in the matrix and a column string specification or an algorithm for creating a column string specification for the matrix are then stored in the system.

A user then executes the program to initiate a program execution phase of the invention. The user may send a request to the system to resize the matrix by clicking and dragging on the matrix or on the graphical window in which the developer has placed the matrix. This request triggers a resize event. When the program detects a resize event, it calls the widths function. Alternatively, the application developer may program the application to readjust the column widths when the data in the matrix changes. This is referred to as a change event. When the program detects a change event, it calls the widths function. The widths function then uses the column string specification to resize the width of each column in the resized matrix.

Preferred embodiments of the present invention are now described with reference to the figures where like reference numbers indicate identical or functionally similar elements. Also in the figures, the left most digit of each reference number corresponds to the figure in which the reference number is first used. While specific steps, configurations and arrangements are discussed, it should be understood that this is done for illustrative purposes only. A person skilled in the relevant art will recognize that other steps, configurations and arrangements can be used without departing from the spirit and scope of the invention.

BRIEF DESCRIPTION OF THE FIGURES

The foregoing and other features and advantages of the invention will be apparent from the following, more particular description of a preferred embodiment of the invention, as illustrated in the accompanying drawings:

FIG. 2 shows a block diagram of the steps taken by the software developer to construct a matrix having a plurality of columns;

FIG. 3 shows a block diagram of the steps taken by the user to trigger the resize event and resize the columns of the matrix;

DETAILED DESCRIPTION OF THE PREFERRED EMBODIMENTS

The present invention relates to an apparatus and method for declarative column specification for matrices. Thus, a developer may use the present invention to specify the width for each column in a matrix using a string specification. Then, when a resize or change event occurs in response to which the display and utility of the matrix may be improved by adjusting the widths of the columns in the matrix, such as when the user resizes the matrix or changes the data in the matrix, each column is automatically resized to fit the matrix according to the string specification.

Figure 1:
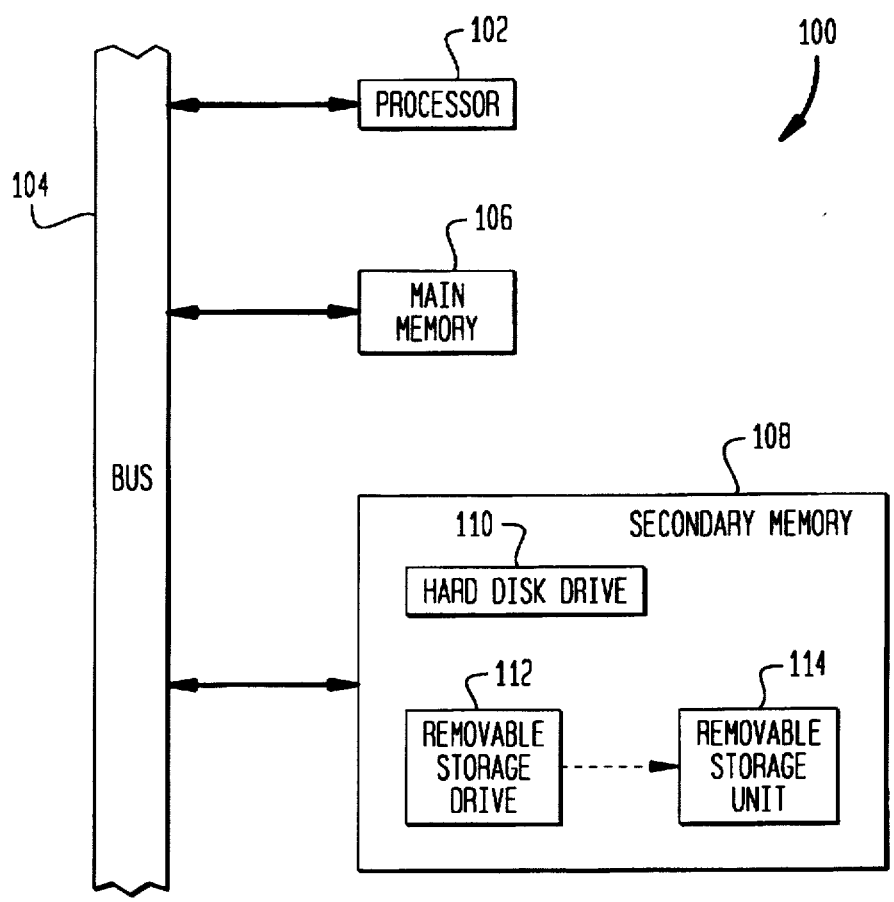
FIG. 1 shows a diagram of the apparatus of the present invention.

In one embodiment, the invention is directed to a computer system operating as discussed herein. An exemplary computer system 100 is shown in FIG. 1. Computer system 100 includes one or more processors, such as processor 102. Processor 102 is connected to a communication bus 104.

Computer system 100 also includes a main memory 106, preferably random access memory (RAM), and a secondary memory 108. Secondary memory 108 includes, for example, a hard disk drive 110 and/or a removable storage drive 112, representing a floppy disk drive, a magnetic tape drive, a compact disk drive, etc. Removable storage drive 112 reads from and/or writes to a removable storage unit 114 in a well-known manner.

Removable storage unit 114, also called a program storage device or a computer program product, represents a floppy disk, magnetic tape, compact disk, etc. As will be appreciated, removable storage unit 114 includes a computer usable storage medium having stored therein computer software and/or data.

Computer programs (also called computer control logic) are stored in main memory and/or secondary memory 108. Such computer programs, when executed, enable computer system 100 to perform the features of the present invention as discussed herein. In particular, the computer programs, when executed, enable procssor 102 to perform the features of the present invention. Accordingly, such computer programs represent controllers of computer system 100.

In another embodiment, the invention is directed to a computer program product comprising a computer readable medium having control logic (computer software) stored therein. The control logic, when executed by the processor 102, causes the processor 102 to perform the functions of the invention as described herein.

In another embodiment, the invention is implemented primarily in hardware using, for example, a hardware state machine. Implementation of the hardware state machine so as to perform the functions described herein win be apparent to persons skilled in the relevant art(s).

The present invention is preferably implemented within the environment of a visual builder application program. A visual builder application program is a GUI that provides tools for developing computer applications. The visual builder application program typically includes integrated utilities for editing, compiling or interpreting, and debugging programming code, and includes interfaces for using and customizing pre-built components. These pre-built components include both graphical components, such as push buttons, list boxes, and matrices, and nongraphical components, such as function libraries. The visual builder application program supports the development and test phases of application development. It is typically accompanied by a runtime product or components or set of libraries that supports the execution phase of the application.

FIG. 2 is a block diagram of a program development stage of the invention. According to the invention, the visual builder application program, when executed, provides the application developer with several choices of tools for writing computer programs. One of these tools creates matrix components. The application developer chooses the matrix tool at step 202. The visual builder application program then executes a create event 204 to generate the matrix. After create event 204 is executed, the application lets the developer set the number of columns and rows in the matrix at step 206. Additionally, the application lets the developer set the width of each column at step 208 using a column specification string. This string specification will be discussed in further detail below.

The visual builder application program then writes appropriate computer code to the computer program to incorporate the matrix (as defined by the application developer) therein at step 210. The code for the computer program is written to contain a widths function for adjusting the width of the columns in the matrix. Alternatively, the computer program may contain calls to the widths function, where this function is part of a library (such as a dynamic link library). Details of the computer program code will be apparent to persons skilled in the relevant art(s) based on the discussion contained herein.

The widths function receives, as input, a reference to a matrix and the column specification string. In the preferred embodiment, the column string specification is stored in the matrix object and the widths function is implemented in the C++ programming language as a method of the matrix object. However, it will be obvious to persons skilled in the relevant art(s) that several other programming languages could be used.

Figure 7:
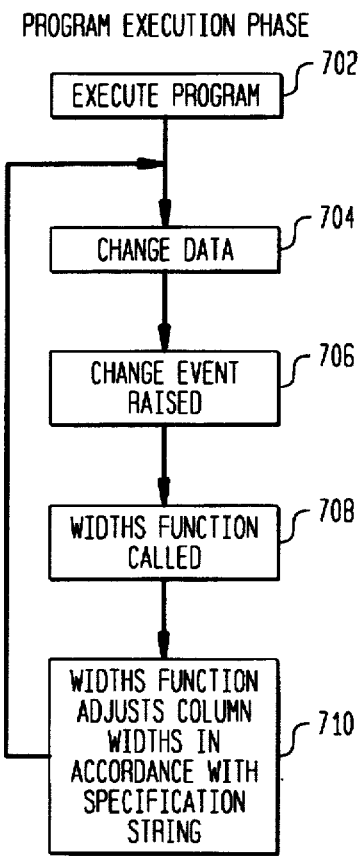
FIG. 7 shows a block diagram of the steps taken by the user to trigger a change event and resize the columns of the matrix.

FIGS. 3 and 7 show block diagrams of the steps taken by the user to trigger a resize event or a change event, respectively, of a program execution stage of the invention. The user begins by executing the program at steps 302 and 702. During execution of the program, the user may resize the entire matrix to make it larger or smaller on the computer display monitor by clicking on a corner of the window (not shown) that contains the matrix and dragging the corner of the window to a new position on the GUI, referred to as a drag-and-drop event. This step is shown in block 304. Alternatively, the user may change the matrix by initiating a process that results in having the matrix display new data. This step is represented in block 704. When the user resizes the matrix, or when the data in the matrix changes, a resize or change event is raised by the program in steps 306 and 706, respectively. The program then calls or triggers the widths function at steps 308 and 708. The widths function uses the column specification string, originally entered by the developer or entered by the developer and modified by a program algorithm, entered by the application developer, before calling the widths function, or created entirely by a program algorithm before calling the widths function, to adjust the column width for each column to optimally display the data in the matrix, as shown in steps 310 and 710. In an alternate embodiment, the user can modify the column string specification or perform actions determined by the developer that result in modifications of the column specification string.

In the preferred embodiment, several predefined symbols can be used by the developer in the column string specification when defining the width of the columns in the matrix. These symbols are recognized by the widths function as denoting individual resize options. It should be apparent to those skilled in the art that any symbol may be used in place of the symbols described below to cause the widths function to perform the string command.

In the preferred embodiment, the developer can describe column width in the column string specification using an explicit length. This type of column specification defines the column in horizontal space units, such as inches or picas. During the resize or change event, the width of a column designated with an explicit length does not change, if the column already has the specified length.

Figure 4:
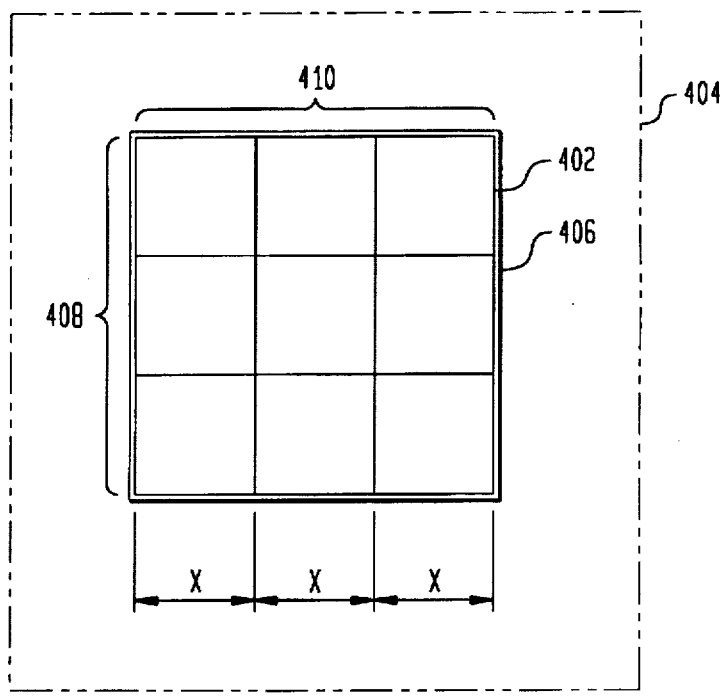
FIG. 4 shows a matrix 402 of the present invention before a resize event.

The developer can also define a column width using an asterisk. An asterisk sizes the width of column so that the remaining space in the resized matrix is assigned to this column. If more than one asterisk is used in a string specification, the function divides the remaining space in the resized matrix equally among the columns designated with asterisks. For example, FIG. 4 shows a matrix 402 of the present invention before the resize event. Matrix 402 is shown displayed on a computer display device (or monitor) 404 and is surrounded by a window 406. Matrix 402 has three rows 408 and three columns 410. In this example, the column string specification is "* * *" for columns 1, 2 and 3, respectively. The width of matrix 402 is divided equally among columns 408, as denoted in FIG. 4 by the horizontal width x.

Figure 5:
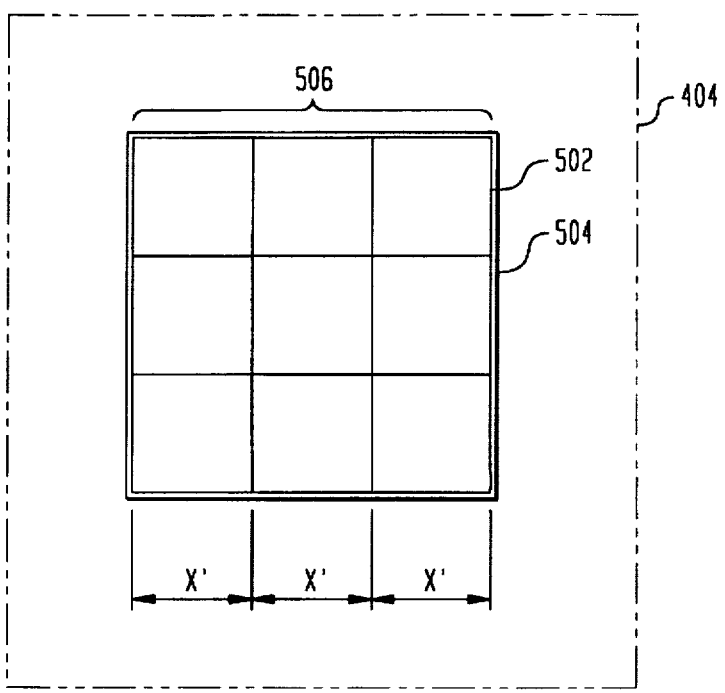
FIG. 5 shows a first resized matrix 502 of the present invention after a resize event of matrix 402.

FIG. 5 shows a first resized matrix 502 after a resize event. In this example, the user performed a drag-and-drop event on window 504 to enlarge the matrix. As shown, the widths function divides the width of resized matrix 502 in three equal parts, each part denoted by the horizontal width x'. Thus, columns 506 are resized so that each column receives one equal part.

Figure 6:
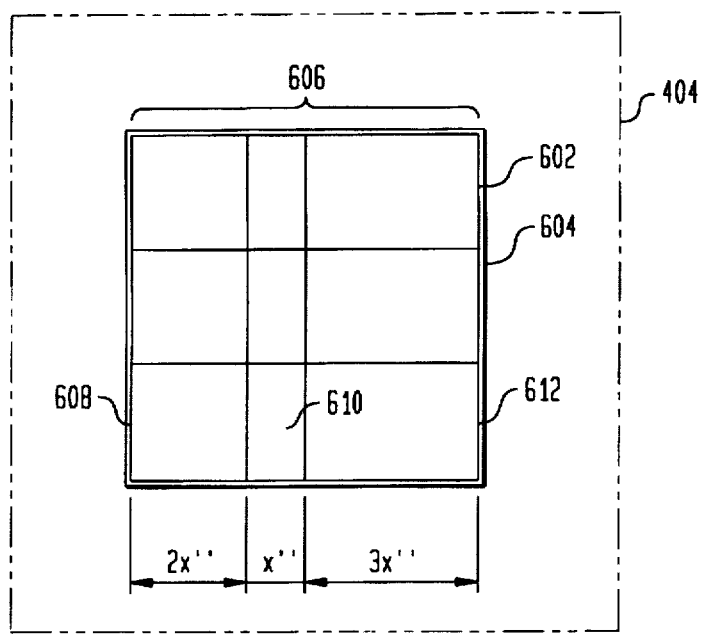
FIG. 6 shows a second reed matrix 602 of the present invention after a resize event of matrix 402.

FIG. 6 shows a second resized matrix 602, after a resize event has occurred, in which a window 604 was enlarged by the user. Multipliers may be used in front of an asterisk to divide the remaining space in resized matrix 602 proportionally among its columns 606 designated with asterisks according to the multipliers. For example, a column string specification may be defined as "n* * t*" for columns 1, 2 and 3, respectively, where n and t are positive rational numbers. In FIG. 6, n=2 and t=3. The widths function divides the space in resized matrix 602 into six equal parts. The first column 608 receives two equal parts (denoted by 2x"), the second column 610 receives one equal part (denoted by x") and the third column 612 receives three equal parts (denoted by 3x"). In another example (not shown), the column string specification command is defined as "10 * 10" for columns 1, 2 and 3, respectively. The widths function subtracts from the width of the resized matrix, the 10 units designated for the first column and the 10 units designated for the third column. The function will then assign to the second column the remaining space in the resized matrix. Thus, if the resized matrix has a total of 50 horizontal units, column 1 is assigned 10 units, column 2 is assigned 30 units and column 3 is assigned 10 units.

The visual builder application also allows the application developer to designate fixed columns and fixed rows in the matrix. These fixed columns and rows do not scroll across the screen with the other columns and rows. Instead, these columns and rows remain fixed in their designated location in the matrix. Fixed columns and rows are typically used for labelling each of the columns and rows in the matrix. In the present invention, the developer can define a column width in the column string specification as a function of the width of the data in the fixed row or rows of the column to be resized.

In the preferred embodiment, the developer can define the width of a column by using an equal sign. The widths function reserves enough space in the resized column to accommodate the length of the longest text string among the fixed rows in that specific column. For example, if a matrix has ten fixed rows, the widths function will check each fixed row to see which row has the longest text string. The equal sign in the column string specification will cause the widths function to resize the column with a width large enough to accommodate that text string. Because the user may manipulate the data in the matrix at any time during the program, the widths function checks each fixed row after each resize event to determine the longest text string at that time. Thus, the use of the equal sign in the column string specification provides a declarative width specification that depends on the current size of the longest text string in the fixed rows of the matrix.

Another symbol that can be used to dynamically define a column width as a function of the longest text string in the resized column is a double equal sign. The application developer may use a double equal sign or "==" in the column string specification to designate a column having a width equal to the maximum width of the text strings in the column. Thus, if the longest text string in the column in the matrix is 10 horizontal units, a double equal sign in the column string specification for that column will cause the widths function to resize that column to have a width of 10 horizontal units. Additionally, as in the equal sign command described above, the widths function checks the contents of the column after detection of each resize or change event to determine the longest text string in the column at that time.

Figure 8:
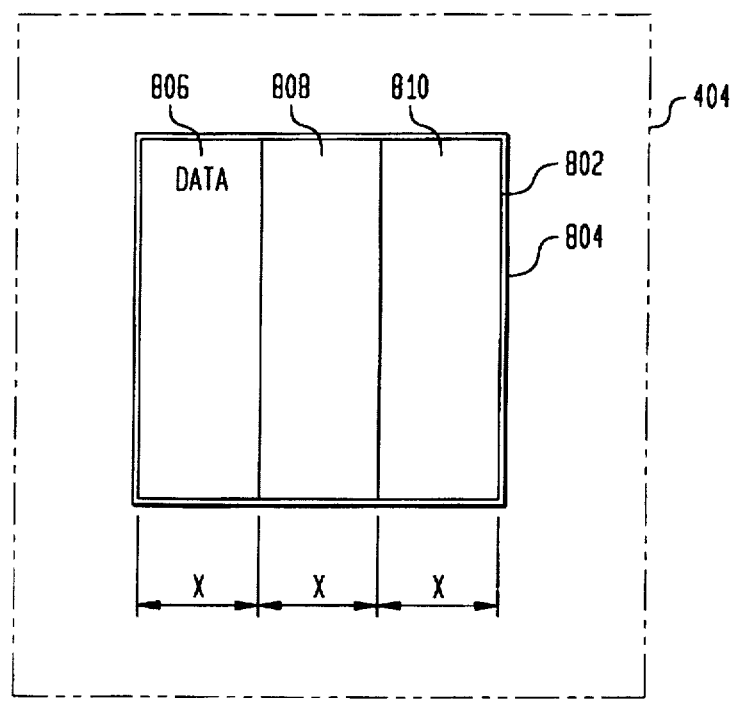
FIG. 8 shows a matrix 802 of the present invention before a change event.

FIG. 8 shows a matrix 802 of the present invention before a change event. Matrix 802 is surrounded by window 804, and has three columns 806, 808 and 810 of equal width. The width of each column is denoted by an X. The column string specification for matrix 802 reads "== * *". As shown in FIG. 8, the "data" in the column 806 is equal to X horizontal units. The remaining width in matrix 802 is divided equally among columns 808 and 810.

Figure 9:
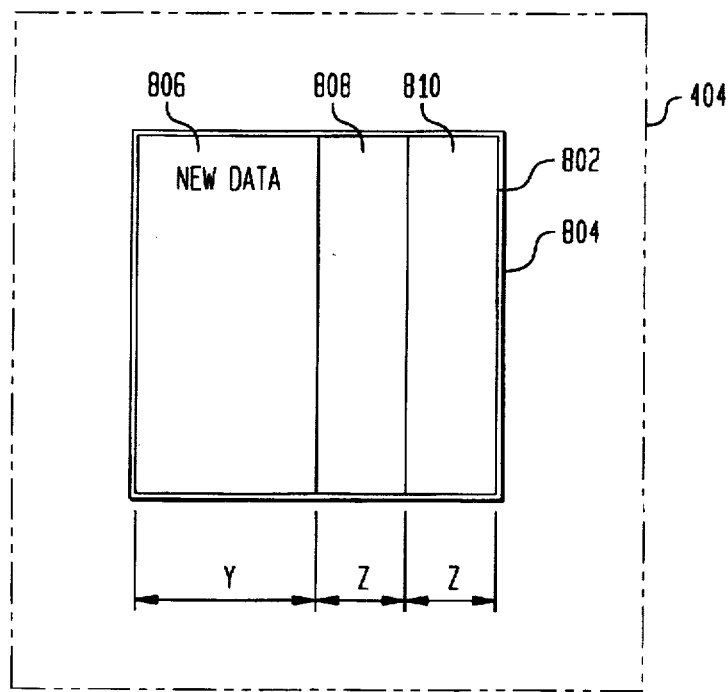
FIG. 9 shows the matrix 802 of the present invention after a change event.

FIG. 9 shows matrix 802 after a change event. The change event was triggered when the user caused "new data" to be entered into column 806. The program detects the change in data in the matrix and uses the string specification to adjust the width of the columns. Because the column 806 is designated with the double equal option, it is enlarged to accommodate the size of the "new data" in that column. The adjusted width of column 806 is denoted by the horizontal units Y. The remaining width in matrix 802 is divided equally among columns 808 and 810. The adjusted width of columns 808 and 810 are denoted by the horizontal units Z.

An application developer may also designate column width in a matrix by using a literal option in the column specification string. This literal option allows the application developer to set the column width to equal the width of a "word" included in the column specification string, where a "word" is an arbitrary sequence of non-blank characters. For example, the application developer could use the literal option to set the column width equal to the width, in horizontal units, of the word "LABEL." Thus, the application developer may simply enter the word in the string specification, as in, for example, "* LABEL *".

Finally, the application developer may use an exclamation point or "!" in the column string specification to leave the widths of specified columns unchanged during a resize or change event. In the present invention the user may manually adjust the width of an individual column by performing a drag-and-drop event on that column. The program can then detect the drag-and-drop event in which the user manually adjusts the width of a column. In the preferred embodiment, the application developer can write code in the drag-and-drop event handler to substitute an exclamation point for the current option designated in the string specification for the resized column. This code win result in a new string specification such as, for example, "* ! *". In this example, the exclamation point option directs the widths function to leave the width of the second column unchanged, and to adjust the widths of columns 1 and 3 to accommodate the widths left or taken up by the user's manual adjustment of column 2.

If the widths function (with or without the exclamation point option) is not used in a drag-and-drop event handler, and the user manually adjusts column 2, then the column width remains as the user adjusted it until the next event occurs that calls the widths function.

The widths function is also programmed with a minimum column-width. In the preferred embodiment, this width can be set by the developer. If the developer does not set a minimum width, the system defaults to a width of 100 twips, where a twip is 1/1440th of an inch. Thus, if the column string specification specifies a width less than the minimum width, then the minimum width is used instead.

If the string specification includes an asterisk and there is no room left for the column, the widths function lets the column keep its current width, if it is greater than the minimum width value. For example, the column string specification command reads "* 10 20" for columns 1, 2 and 3, respectively. In the original matrix, having a horizontal width of 50 units, column 1 is 20 units, column 2 is 10 units and column 3 is 20 units. However, if the user resizes the matrix to a width of 30 units, there is no space left for column 1 after subtracting the widths for columns 2 and 3 from the resized matrix. Thus, the widths function causes a scroll bar to appear on the matrix, and column 1 retains its width of 20 units. However, now the user must scroll the matrix to see all the columns in the matrix. Because the combined column widths are greater than the resized matrix width, the columns are not all visible on the matrix.

While the invention has been particularly shown and described with reference to preferred embodiments thereof, it will be understood by those skilled in the art that various changes in form and details may be made therein without departing from the spirit and scope of the invention.

What is claimed is:

1. A method for enabling a developer to write a computer program that, when executed, displays a matrix on a computer display device, comprising the steps of:

receiving from a developer a request to build a matrix having a plurality of rows and columns;

receiving from the developer a string specification for the width of each of said plurality of columns in said matrix; and storing code in the computer program corresponding to said request and said string command.

2. The method of claim 1, wherein said string specification comprises an asterisk option, said asterisk option causing one of said plurality of columns to be resized to a width equal to the remaining width of said resized matrix.

3. The method of claim 1, wherein one of said plurality of rows comprises a fixed row.

4. The method of claim 3, wherein said string specification comprises an equal option, said equal option causing one of said plurality of columns to be resized to a width equal to the width of the longest text string in said fixed row in said column.

5. The method of claim 1, wherein said string specification comprises a double equal option, said double equal option causing one of said plurality of columns to be resized to a width equal to the width of the longest text string in said column.

6. The method of claim 1, wherein said string specification comprises a literal width option, said literal width option causing one of said plurality of columns designated with said literal width option to be resized to a width that equals the width of a word.

7. The method of claim 1, wherein said string specification comprises an exclamation point option, said exclamation point option causing one of said plurality of columns to retain its current width.

8. A method, embodied in a computer program, for displaying a matrix on a computer display device, the matrix having a plurality of rows and columns, comprising the steps of:

executing the computer program;

receiving a resize or change event; and using a specification string, wherein the string specification was previously defined by a developer, to resize the width of each of said columns in accordance with the width of data in said resized or changed matrix.

9. The method of claim 8, wherein said string specification comprises an asterisk option, said asterisk option causing one of said plurality of columns to be resized to a width equal to the remaining width of said resized matrix.

10. The method of claim 8, wherein one of said plurality of rows comprises a fixed row.

11. The method of claim 10, wherein said string specification comprises an equal option, said equal option causing one of said plurality of columns to be resized to a width equal to the width of the longest text string in said fixed row in said column.

12. The method of claim 8, wherein said string specification comprises a double equal option, said double equal option causing one of said plurality of columns to be resized to a width equal to the width of the longest text string in said column.

13. The method of claim 8, wherein said string specification comprises a literal width option, said literal width option causing one of said plurality of columns designated with said literal width option to be resized to a width that equals the width of a word.

14. The method of claim 8, wherein said string specification comprises an exclamation point option, said exclamation point option causing one of said plurality of columns to retain its current width.

15. A system for enabling a developer to write a computer program that, when executed, displays a matrix on a computer display device, said system comprising:

means for receiving from a developer a request to build a matrix having a plurality of rows and columns;

means for receiving from the developer a string specification for the width of each of said plurality of columns in the matrix; and means for storing code in the computer program corresponding to said request and said specification string.

16. The system of claim 15, wherein said string specification comprises an asterisk option, said asterisk option causing one of said plurality of columns designated with said asterisk option to be resized to equal the remaining width of said resized matrix.

17. The system of claim 15, wherein one of said plurality of rows comprises a fixed row.

18. The system of claim 17, wherein said string specification comprises an equal option, said equal option causing one of said plurality of columns designated with said equal option to be resized to a width equal to the width of the longest text string in said fixed row in said column.

19. The system of claim 15, wherein said string specification comprises a double equal option, said double equal option causing one of said plurality of columns designated with said double equal option to be resized to a width equal to the width of the longest text string in said column.

20. The system of claim 15, wherein said string specification comprises a literal width option, said literal width option causing one of said plurality of columns designated with said literal width option to be resized to a width that equals the width of a word comprising said literal width option.

21. The system of claim 15, wherein said string specification comprises an exclamation point option, said exclamation point option causing one of said plurality of columns to retain its current width.

22. A method for displaying a matrix on a computer display device, comprising the steps of:

executing a computer program;

receiving a resize or change event; and using a specification string, wherein the string specification was previously defined by a developer, to resize the width of a plurality of columns in accordance with the width of the resized or changed matrix.

23. The method of claim 22, wherein said string specification comprises an asterisk option, said asterisk option causing one of said plurality of columns to be resized to a width equal to the remaining width of said resized matrix.

24. The method of claim 22, wherein one of said plurality of rows comprises a fixed row.

25. The method of claim 24, wherein said string specification comprises an equal option, said equal option causing one of said plurality of columns to be resized to a width equal to the width of the longest text string in said fixed row in said column.

26. The method of claim 22, wherein said string specification comprises a double equal option, said double equal option causing one of said plurality of columns to be resized to a width equal to the width of the longest text string in said column.

27. The method of claim 22, wherein said string specification comprises a literal width option, said literal width option causing one of said plurality of columns designated with said literal width option to be resized to a width that equals the width of a word.

28. The method of claim 22, wherein said string specification comprises an exclamation point option, said exclamation point option causing one of said plurality of columns to retain its current width.

29. A computer program product for use with a computer display device, said computer program product comprising:

a computer usable medium having computer readable program code means embodied in said medium for enabling a developer to write a computer program that, when executed, displays a matrix on a computer display device, said computing readable code means having:

a computer readable program code means for receiving from a developer a request to build a matrix having a plurality of rows and columns;

a computer readable program code means for receiving from the developer a specification string for the width of each of said plurality of columns in said matrix; and a computer readable program code means for storing code in the computer program corresponding to said request for said string command.

30. The computer program product of claim 29, wherein said specification string comprises an asterisk option, said asterisk option causing one of said plurality of columns to be resized to a width equal to the remaining width of said resized matrix.

31. The computer program product of claim 29, wherein one of said plurality of rows comprises a fixed row.

32. The computer program product of claim 31, wherein said specification string comprises an equal option, said equal option causing one of said plurality of columns to be resized to a width equal to the width of the longest text string in said fixed row in said column.

33. The computer program product of claim 29, wherein said specification string comprises a double equal option, said double equal option causing one of said plurality of columns to be resized to a width equal to the width of the longest text string in said column.

34. The computer program product of claim 29, wherein said specification string comprises a literal width option, said literal width option causing one of said plurality of columns designated with said literal width option to be resized to a width that equals the width of a word.

35. The computer program product of claim 29, wherein said specification string comprises an exclamation point option, said exclamation point option causing one of said plurality of columns to retain its current width.

36. A computer program product for use with a computer display device, said computer program product comprising:

a computer usable medium having computer readable program code means embodied in said medium for displaying a matrix on a computer display device, said matrix having a plurality of rows and columns, and said computing readable code means having:

a computer readable program code means for executing the computer program;

a computer readable program code means for receiving a resize or a change event; and a computer readable program code means for using a specification string, wherein the string specification was previously defined by a developer, to resize the width of each of said columns in accordance with the width of said resized or changed matrix.

37. The computer program product of claim 36, wherein said specification string comprises an asterisk option, said asterisk option causing one of said plurality of columns to be resized to a width equal to the remaining width of said resized matrix.

38. The computer program product of claim 36, wherein one of said plurality of rows comprises a fixed row.

39. The computer program product of claim 38, wherein said specification string comprises an equal option, said equal option causing one of said plurality of columns to be resized to a width equal to the width of the longest text string in said fixed row in said column.

40. The computer program product of claim 36, wherein said specification string comprises a double equal option, said double equal option causing one of said plurality of columns to be resized to a width equal to the width of the longest text string in said column.

41. The computer program product of claim 36, wherein said specification string comprises a literal width option, said literal width option causing one of said plurality of columns designated with said literal width option to be resized to a width that equals the width of a word.

42. The computer program product of claim 36, wherein said specification string comprises an exclamation point option, said exclamation point option causing one of said plurality of columns to retain its current width.

43. A program storage device readable by a machine, tangibly embodying a program of instructions executable by the machine to perform method steps for causing a column on a computer display device to change in width according to the change in size of a matrix, said method steps comprising:

receiving from a developer a request to build a matrix having a plurality of rows and columns;

receiving from the developer a specification string for the width each of said plurality of columns in said matrix; and storing code in the computer program corresponding to said request and said specification string.

44. The program storage device of claim 43, wherein said specification string comprises an asterisk option, said asterisk option causing one of said plurality of columns to be resized to a width equal to the remaining width of said resized matrix.

45. The program storage device of claim 43, wherein one of said plurality of rows comprises a fixed row.

46. The program storage device of claim 45, wherein said specification string comprises an equal option, said equal option causing one of said plurality of columns to be resized to a width equal to the width of the longest text string in said fixed row in said column.

47. The program storage device of claim 43, wherein said specification string comprises a double equal option, said double equal option causing one of said plurality of columns to be resized to a width equal to the width of the longest text string in said column.

48. The program storage device of claim 43, wherein said specification string comprises a literal width option, said literal width option causing one of said plurality of columns designated with said literal width option to be resized to a width that equals the width of a word.

49. The program storage device of claim 43, wherein said specification string comprises an exclamation point option, said exclamation point option causing one of said plurality of columns to retain its current width.

50. A program storage device readable by a machine, tangibly embodying a program of instructions executable by the machine to perform method steps for causing a column on a computer display device to change in width according to the change in size of a matrix, said method steps comprising:

executing the computer program;

receiving a resize or a change event; and using a specification string, wherein the string specification was previously defined by a developer, to resize the width of each of said columns in accordance with the width of said resized or changed matrix.

51. The program storage device of claim 50, wherein said specification string comprises an asterisk option, said asterisk option causing one of said plurality of columns to be resized to a width equal to the remaining width of said resized matrix.

52. The program storage device of claim 50, wherein one of said plurality of rows comprises a fixed row.

53. The program storage device of claim 52, wherein said specification string comprises an equal option, said equal option causing one of said plurality of columns to be resized to a width equal to the width of the longest text string in said fixed row in said column.

54. The program storage device of claim 50, wherein said specification string comprises a double equal option, said double equal option causing one of said plurality of columns to be resized to a width equal to the width of the longest text string in said column.

55. The program storage device of claim 50, wherein said specification string comprises a literal width option, said literal width option causing one of said plurality of columns designated with said literal width option to be resized to a width that equals the width of a word.

56. The program storage device of claim 50, wherein said specification string comprises an exclamation point option, said exclamation point option causing one of said plurality of columns to retain its current width.

* * * * *